Jan. 29, 1963 — E. COHEN — 3,075,448
BLAST VALVE AND METHOD OF BLAST PROTECTION
Filed June 30, 1960 — 2 Sheets-Sheet 1

INVENTOR.
EDWARD COHEN
BY
Harold F. Wilhelm
ATTORNEY

Jan. 29, 1963   E. COHEN   3,075,448
BLAST VALVE AND METHOD OF BLAST PROTECTION
Filed June 30, 1960   2 Sheets-Sheet 2

INVENTOR.
EDWARD COHEN
BY
Harold F. Wilhelm
ATTORNEY

Patented Jan. 29, 1963

3,075,448
BLAST VALVE AND METHOD OF BLAST
PROTECTION
Edward Cohen, Williston Park, N.Y., assignor to Ammann & Whitney, New York, N.Y., a partnership
Filed June 30, 1960, Ser. No. 39,938
9 Claims. (Cl. 98—1)

The invention relates to the protection of facilities or chambers against blasts from atomic or other explosions, and more particularly to a blast valve which is self-acting and is operated directly by the blast pressure.

One method of providing general protection against such blasts is to provide a structural chamber of adequate strength made of some tough material, such as reinforced concrete or steel. In the event the facilities housed in this chamber require air, one or more air ducts or shafts leading to atmosphere are provided. One duct may draw fresh air from atmosphere into the chamber, and another duct may return used air to the atmosphere. To protect the facility against blast, it has heretofore been proposed to place valves of various kinds in the intake and return ducts, which valves are closed automatically upon occurrence of the blast. Some valves are operated remotely by special sensor devices directly exposed to the blast, and others are operated by overpressure generated by the blast acting directly on the valve itself. The invention relates to protection by the valves of the latter type or a combination of the two types.

According to one preferred form of the invention, a vertical supply or exhaust shaft is provided with a valve port or seat having an upstanding rib or flange. Disposed above the seat is a guard plate. The guard plate is supported by a series of webs and cylinders extending through the seat and resting upon a suitable base located below the seat. A hollow disk is spaced above the guard plate, which disk has a series of rods extending into the cylinders and having dash pot relationship therewith. The hollow disk has a top layer of cushioning material. Above the hollow disk is a valve closure having a crown top or actuating portion and a depending cylindrical skirt or closure portion. The depending skirt has close fitting relation with the hollow disk and sealing relation with the guard plate. Suitable soft spring devices act between the guard plate and the closure to hold the valve in normally open position, with the lower edge of the valve skirt adjacent the guard plate. This provides an annular area, defining the valve mouth, between the skirt and the seat.

Upon exposure to a shock wave, the over-pressure accelerates the closure downwardly against the soft springs. The valve skirt telescopes the upstanding flange of the valve seat, closing the valve. The closure then engages the cushion layer, after which the hollow disk moves downwardly against its dash pot shock absorbers. Upon cessation of the positive phase of the blast, the light springs will reopen the valve.

If desired, in cases where pressures caused by the negative phase of the blast are critical, a special latching arrangement may be provided to hold the valve closed. In any event, manually operated means may be provided for opening and closing the valve at will.

The valve may be arranged in a shaft in which the protected portion of the shaft under the valve is connected to a large plenum chamber for absorbing that small portion of the blast which passes through the valve before the valve has time to close. Or, if desired, the valve may be used in a shaft which has a time delay path leading from an exposed portion of the shaft just above the valve to the valve mouth, which path will delay passage of the shock wave until the valve has time to close, or until a predetermined amount of closing has been achieved.

Other objects and features of the invention will be more apparent from the following description when considered with the following drawings, in which.

Figure 1:
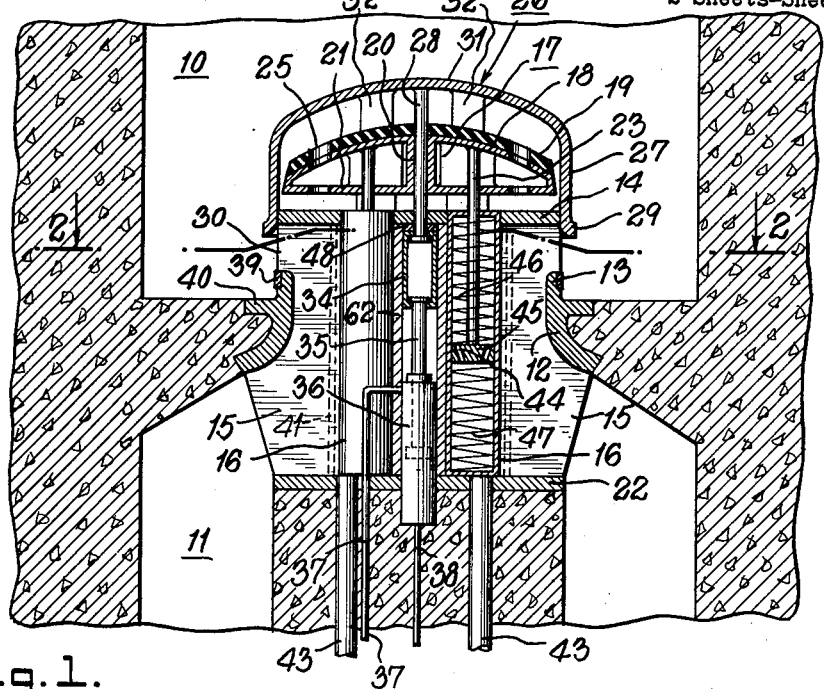
FIG. 1 is a vertical section through a ventilation shaft equipped with one form of blast valve according to the invention.

In the following description and in the claims, various details are identified by specific names, for convenience, but they are intended to be as generic in their application as the art will permit.

Like reference characters denote like parts in the several figures of the drawings.

In the accompanying drawings and description forming part of this specification, certain specific disclosure of the invention is made for purposes of explanation, but it will be understood that the details may be modified in various respects without departure from the broad aspect of the invention.

Figure 2:
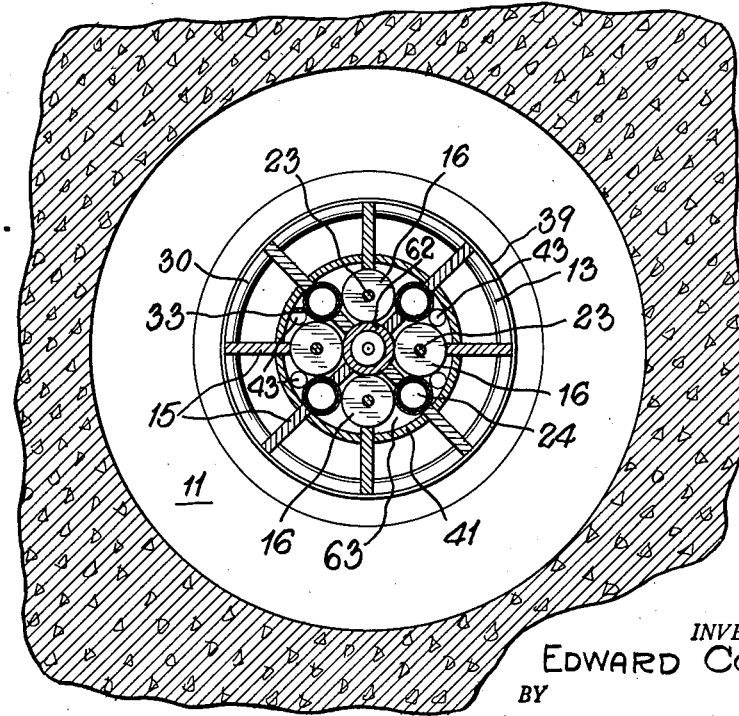
FIG. 2 is a transverse section on the line 2—2 of FIG. 1.

Referring now to FIGS. 1 and 2, the ventilation shaft has an upper portion 10 connecting with atmosphere and is thus exposed to the atomic blast. The lower portion 11 of the shaft leads to the protected chamber or facility (not shown) and is protected by the blast valve. The lower portion 11 connects directly with an adequately sized expansion plenum chamber (not shown) to provide attenuation of the outside over-pressure during the time the valve is closing; this limits transmission of pressures not tolerable within the facility before complete closing of the blast valve.

The shaft 10, 11 may be an intake shaft through which air is drawn to supply the facility; or, it may be an exhaust shaft through which air from the facility is delivered to atmosphere. In either case the valve is normally open, and is of such nature as not to introduce excessive pressure drop under normal ventilating conditions.

The valve comprises a metal ring seat 12 set into a concrete ledge forming part of the vertical shaft. The seat has an annular flange 40 and an upstanding rib 13, the latter having a sealing band 39. The valve also comprises a movable closure 26 having a depending skirt 27 cooperating with rib 13, as explained below. It will be noted that the skirt 27 and the rib 13 of seat 12 provide an annular mouth 30 having direct connection to the upper portion 10. This annular mouth also has direct connection, through the seat, to the lower portion 11.

Under the seat 12 is a concrete base on which is located a base plate 22. Above the seat 12 is a guard plate 14 supported by a series of vertical webs 15 and a series of shock absorber units 16, both resting on the base plate 22.

To take the shock of valve closing due to a blast, a special multi-stage shock-absorption assembly is provided. This comprises a hollow disk 17 having a convex top 18 and a flat bottom 21. The convex top has a layer 19 of cushioning material, such as rubber. The disk 17 has a rod guide 20 and a series of vents 25. It also has a series of piston rods 23 passing within the units 16 and having shock absorbing dash pot relation therewith, as explained hereinafter. The hollow disk 17 also has a series of openings for light spring assemblies 24, see also FIG. 3.

The valve closure 26 comprises a crown top 31 and a depending cylindrical skirt 27 whose bottom terminates in a flare 29. The valve closure 26 also has a valve rod 28 passing through rod guide 20. It will be understood that the closure 26, when moved downwardly, causes its skirt 27 to telescopically engage the upstanding ribs 13 and attached seal 39 to close the valve.

Figure 3:
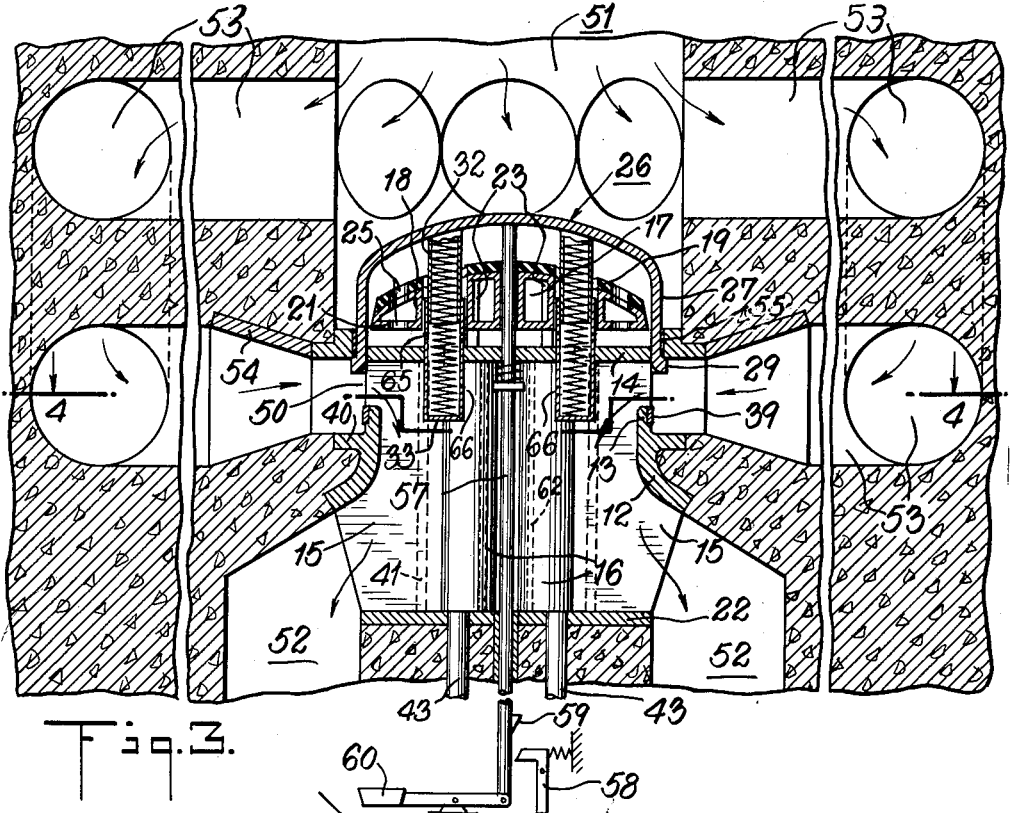
FIG. 3 is a vertical section taken through a ventilation shaft illustrating a modified construction.

The valve closure 26 is yieldably held in open position by the series of light spring assemblies 24, see also FIG. 3. Each spring assembly comprises a lower cup or tube 33 seated in guard plate 14 and web 15, and an upper tube 32 secured to the closure. A light helical spring operates between the two telescoping cups or tubes.

For manual operation, a pneumatic operating mechanism is employed. An operating air cylinder 36 is mounted on the base plate 22. Air cylinder 36 contains a piston having rod 35. Rods 35 and 28 have end enlargements surrounded by an overrunning sleeve 34. Air lines 37 and 38 connect the top and bottom of air cylinder 36. These lines extend to suitable valve and compressed air mechanism (not shown) located in the protected chamber or at some other control point.

To close the blast valve manually, air pressure is applied to upper line 37 to move the piston in cylinder 36 downwardly. The spring assemblies 24 will normally return the closure 26 to open position upon removal of air pressure from line 37. But if the closure 26 should stick in closed position, air pressure is applied to lower line 38; this moves the piston in cylinder 36 upwardly, causing piston rod 35 to engage valve rod 20 to move the closure 26 to full open position.

It will be noted that the fit between cylindrical skirt 27 and guard plate 14 is reasonably tight. When the closure 26 closes quickly under excessive outside pressure resulting from nuclear detonation or other cause, the closure 26 accelerates quickly, first against the resistance of the soft springs 24 until it engages the soft shock absorbing layer 19, and thence causing the hollow disk 17 to move downwardly against the shock absorbers 16. The mouth 30 is closed by skirt 27 prior to contact between closure 26 and soft shock absorbing layer 19.

To prevent air trapped below the closure 26 from delaying closing of the valve, the space enclosed by skirt 27 and guard plate 14 is vented to a low pressure area located, for example, in the protected facility.

Provision for venting is as follows. An enclosure 41 surrounds the posts 16 and spring assemblies 24. An inner tube 62 surrounds the air cylinder 36 and overrunning sleeve 34. The space between enclosure 41 and tube 62 constitutes a vent space 63 connecting with relief ducts 43 leading to the protected facility.

Lower tubes 33 of the spring assemblies have relief openings 65 above the guard plate 14 and relief openings 66 on both sides of the vertical webs 15 below the guard plate 14. These openings 65, 66 relieve pressure inside the telescoping tubes when their springs are compressed and also serve to connect the space above guard plate 14 with the vent space 63.

The rods 23 have pistons 45 slidable in the cylinders 16. Hydraulic fluid is disposed both above and below the pistons 45 which have leakage openings 44 to permit liquid to move slowly from one side of the pistons to the other. Lower helical springs 47 operate to return the hollow disk 17 to proper position after it has been depressed. Upper springs 46 limit the upward movement of the hollow disk 17 after it has been depressed. A resilient washer or spring device 48 is located between guard plate 14 and overrunning sleeve 36 to soften and limit the upward return movement of the valve closure 26 after it has been depressed.

The shock absorbing action is more important from the standpoint of both stress distribution and timing. The shock absorbing action may be said to take place in three stages. Upon exposure to a blast, the closure member 26 moves relatively freely against light springs 24 until the skirt 27 first engages the annular rib 13. The valve is thus closed and affords protection to the facility as soon as the skirt 27 engages the annular rib 13 and before any over-travel of the closure takes place.

When the skirt 27 first engages rib 13, the crown 31 engages the cushion 19 which acts to accelerate the hollow disk 17. The hollow disk then moves downwardly and is decelerated by the dash pot action of the hydraulic shock absorbers 16, 23. Some time after the valve skirt 27 engages rib 13, but before it reaches its full travel, the closure 26 is completely decelerated and the shock of closing is completely absorbed. The time and point at which this occurs depends on the strength of the applied shock pressure.

Upon removal of the blast pressure, the light springs 27 return the closure 26 to open position independently of disk 17, and the dash pot springs 47 return the hollow disk 17 to normal position. Washer 48 limits upward movement of closure 26 and springs 46 limit upward movement of hollow disk 17.

The flare 29 on the skirt and the special sealing band 39 on the annular rib cooperate to seal the valve both while the valve is executing its over-travel and after the valve has completely seated.

The movable closure 26 may be made of structurally light material since it is protected by the shock absorbing devices from disruptive stress. The engagement of the crown 31 with the cushion 19 transmits the closing force to the cushion which, in turn, transmits the closing force to the hollow disk 17 which may be made sufficiently heavy and rugged to withstand the stresses of absorbing the shock of decelerating the valve.

The pneumatic operator allows remote actuation of the blast valve from a control center, and local or remote operation of the equipment. Switches, not shown, tripped by the motion of the blast valve, may be used to indicate full open and full closed positions. Provision may be made for automatic operation of the valve by sensor devices directly exposed to the blast, as insurance against failure of operation by direct application of over-pressure to the valve. Where a thermal, nuclear radiation, or electromagnetic sensor is employed, closure may occur prior to arrival of the blast pressure. In this case the operation by direct application of over-pressure acts as insurance for failure or destruction of the automatic sensor activated closure arrangement.

Figure 4:
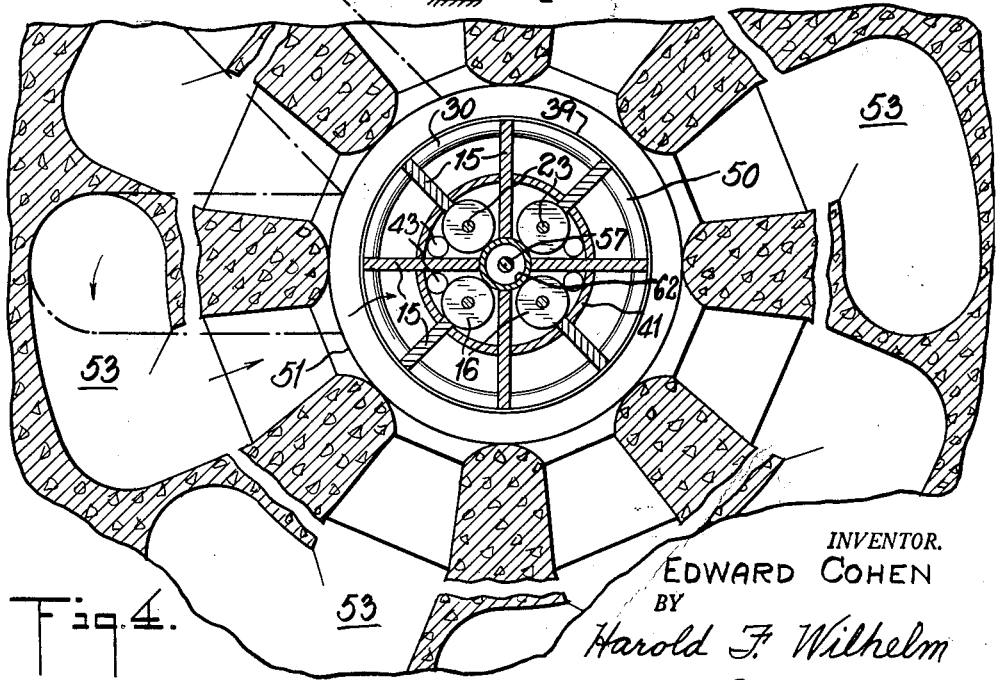
FIG. 4 is a transverse section taken on the line 4—4 of FIG. 3.

Referring now to FIGS. 3 and 4, here the shaft, which may be either air intake or air exhaust, is provided with a series of time delay paths 53. These may be of any computed length and may be used either with or without a plenum chamber of computed volume on the protected side of the valve. The length of delay path and volume of plenum are coordinated with the closing time of the valve so as to limit over-pressures on the protected side to non-damaging levels.

In this form the blast valve is similar to that illustrated in FIGS. 1 and 2, except that, instead of the pneumatic operator for manually closing the valve, mechanical means is provided for manual closing, and provision is made for latching the valve closed. Similar parts in this valve are given the same reference characters as corresponding parts in the valve illustrated in FIGS. 1 and 2; for simiplicity, description will not be repeated.

The valve skirt 27 is surrounded by a sealing plate 54 to prevent direct communication between the upper shaft portion 51 and the annular valve mouth 50. The skirt 27 has close sliding relationship with both guard plate 14 and sealing plate 54. Seal details are provided at these points as required, a sealing device being indicated at 55. Thus, the normal intake ventilation path comprises the upper shaft portion 51, delay paths 53, the annular valve mouth 50, the valve throat, and the lower portion 52 of the shaft.

For manually operating the valve and automatically latching it closed, the valve rod 57 extends down below the base plate 22 to a latching mechanism. The latching mechanism comprises a spring-pressed pivoted catch 58 having a cam surface engaging with a cam surface on an abutment 59 on the valve rod 57. A hand lever 60 is pivoted to a suitable stationary support and to valve rod 57. Both hand lever 60 and catch 58 may be located in a protected area.

Thus it will be seen that, upon exposure to a blast, when the valve reaches fully closed position, it will automatically latch shut. The valve may also be latched shut at will by operation of the hand lever 60. Whenever the valve is latched shut, it may be released by manual disengagement of the catch 58.

The valve in either FIG. 1 or 3 may be constructed with or without automatic latching mechanism. Without the latch, the valve would ordinarily return to open position after the positive phase of the blast. In cases using a latch, the valve will remain closed during the passing of the negative phase. Catches may be used in installations where negative pressure are critical.

It will be understood that the parts of the ventilation shafts will be made of suitable hard material such as concrete, while parts of the valve mechanism will be made of suitable metal, such as aluminum or steel.

It will be understood that the several cushioning and shock absorbing devices operate efficiently over a complete range of loads and automatically compensate for different impact speeds.

The valve possesses a favorable overall weight to capacity ratio since the weight of the moving parts consists essentially of the top crown with skirt which can be made fairly light in weight. The travel and the diameter of the valve closure which defines the peripheral air flow area or mouth (air intake or exhaust) can be varied to give the desired combination of closing time, sealing and overtravel requirements for energy dissipation by shock absorption devices of inertia forces for a given capacity.

The force resisting closing of the valve is negligible since the area exposed to blast pressure, acting to resist closing, is only that of the cross-section of the moving skirt 27. This resisting force is quite insignificant, in contrast to resisting forces in simple poppet valves. Since for the large air flow capacities feasible with this design, the weight of moving parts is relatively small, closing times are also favorable.

Such valves can be arranged to protect against overpressures ranging from two pounds to several hundred pounds per square inch gauge; to protect a wide range of things—from sensitive devices such as air-filters to more rugged devices such as heavy machinery.

The inherent leakage past the movable closure during the time it is closing is reduced to a minimum. This reduction in leakage reduces the pressure build-up behind the moving closure member, and increases the net effective pressure acting to seat the closure. This is in direct contrast to the ordinary conventional disk poppet valve where a relatively heavy disk, center-guided by a thin rod, is closed by the blast, and must close against a differential over-pressure created by the leakage past the disk.

The use of the time delay path in FIG. 3 enables the over-pressure to close the valve before the blast pressure arrives at the entrance to the chamber or facility. Absolute isolation from the effects of the blast valve can be obtained if the time delay path is sufficiently long.

If an adequately sized expansion plenum chamber is used in lieu of the delay path, this will provide attenuation of the outside over-pressure during the time the valve is closing and will limit transmission of any pressure not tolerable within the facility before complete closure of the valve.

If desired, when using a time delay path of adequate length, as in FIG. 3, the guard plate 14 may be omitted since the time delay path and the guard palte complement each other. Both prevent blast pressure from reaching the underside of the valve closure while the blast pressure is forcing the valve closed.

In cases where the guard plate is omitted and the shaft is not used for ventilation purposes continuously, the valve may be normally closed. In such event, air discharged from the facility acting on the undersurface of the valve may be used automatically to open the valve to discharge air to atmosphere.

While certain novel features of the invention have been disclosed herein, and are pointed out in the annexed claims, it will be understood that various omissions, substitutions and changes may be made by those skilled in the art without departing from the spirit of the invention.

I claim:

1. In a blast protection device, a chamber to be protected, a conduit connecting said chamber with an area subject to blast, a blast valve in said conduit, said valve comprising an annular seat having an annular rib, a base below said seat, a guard platform on the opposite side of said seat from said base, means supporting said platform from said base, a shock-absorbing member above said platform, shock-absorbing means supporting said member from said base, a valve closure having a portion disposed above said shock-absorbing member and having an annular depending skirt closely surrounding said platform and adapted to telescope said rib, soft spring means mounted on said platform and supporting said closure, whereby a blast wave causes said skirt first to engage the edge of said rib, and then said closure to engage said shock-absorbing member, and then said shock-absorbing member to yield and said skirt to telescope said rib.

2. In a shelter for protecting against atomic or other explosions, a chamber, facilities in said chamber requiring a supply of atmospheric air, a ventilating conduit leading from said chamber to atmosphere, said chamber and conduit having walls of material sufficiently strong to resist the explosion, a blast valve in said conduit, said valve comprising a port controlling flow through the conduit, a movable closure comprising an actuating portion and a closure portion, yieldable means to hold said closure in open position, said actuating portion being exposed to a blast wave originating at said explosion, and travelling through air in said conduit to exert force against said actuating portion, attenuating means to protect the other side of said actuating portion from said blast at least until said closure portion has moved a predetermined distance toward said port.

3. In the shelter of claim 2, said closure comprising a cylindrical wall and an end wall, the end wall constituting the actuating portion and being exposed to the blast wave, the cylindrical portion constituting the closure portion, said attenuation means comprising a seal slidably engaging said cylindrical wall and protecting the underside of said end wall from the blast.

4. In the shelter of claim 2, said conduit having a seal slidably engaging said closure, said closure portion being spaced from said valve port when in open position, said attenuation means comprising a time delay path having one end exposed to the blast and the other end in communication with said valve port under said seal, whereby said path delays passage of the shock wave to said port until said closure portion has moved a predetermined distance toward said port.

5. In the shelter of claim 2, means for automatically holding said valve closure in closed position after it is closed by the blast wave, whereby to protect the facility against negative pressures caused by the negative phase of the blast.

6. In the shelter of claim 2, means for manually closing said valve closure at will, overrunning means to permit said valve closure to close by application of the blast wave.

7. In a blast protection device, an area protected from the blast including a chamber, a conduit connecting said chamber with an area subject to blast, a blast valve in said conduit, said valve comprising an annular seat with an annular rib projecting on the side facing the blast, a guard disposed on the side of the seat facing the blast and spaced from said seat, a valve closing having an end wall and a depending annular skirt, means yieldably to hold said closure in open position with said skirt spaced from said rib, and to permit said skirt to telescope said rib, said skirt surrounding and closely fitting said guard, said closure and guard defining a closed space, a vent connecting said closed space with said protected area to prevent any pressure build-up in said closed space when said closure is actuated by a blast wave, a shock absorber, means to permit said closure to close freely until said skirt initially engages said rib and then to cause said shock absorber to resist movement of said closure while said skirt is overrunning said rib.

8. In a shelter for protecting against atomic or other explosions, a chamber, a facility in said chamber requiring a supply of atmospheric air, a ventilating conduit leading from said chamber to atmosphere, said chamber and conduit having walls of material sufficiently strong to resist the explosion, a blast valve in said conduit, said valve comprising a port controlling flow through the conduit, a movable closure comprising an actuating portion and a closure portion, yieldable means to hold said closure in open position, said actuating portion being exposed to a blast wave originating at said explosion, and travelling through air in said conduit to exert force against said actuating portion, attenuating means to protect the other side of said actuating portion from said blast until said closure portion has moved a predetermined distance toward said port, means permitting said closure portion to overrun said port, a shock absorber, means permitting said closure to close freely until said closure portion initially closes said port and then causing said shock absorber to resist movement of said closure while said closure portion is overrunning said port.

9. The method of protecting, from atomic or other explosion, a facility requiring air for its operation, said facility being located in chamber connected to atmosphere by a ventilating conduit, said conduit having a blast valve, said blast valve having a port in said conduit, a movable valve closure comprising an actuating portion and a closure portion, yieldable means to hold said closure in open position, one side of said actuating portion being exposed to the blast wave originating at said explosion; said method comprising travelling said wave through air in said conduit to exert a closing force against said actuating portion, and impeding travel of said wave to the other side of said actuating portion at least until said closure has moved a substantial distance toward said port.

References Cited in the file of this patent

UNITED STATES PATENTS

| | | |
|---|---|---|
| 984,994 | Armstrong | Feb. 21, 1911 |
| 2,024,042 | Jance | Dec. 10, 1935 |
| 2,245,271 | Guill | June 10, 1941 |
| 2,490,175 | Thurman | Dec. 6, 1949 |
| 2,704,983 | Van Dronkelaar | Mar. 29, 1955 |
| 2,801,067 | Mercier | July 30, 1957 |

FOREIGN PATENTS

| | | |
|---|---|---|
| 147,053 | Austria | May 15, 1936 |
| 678,563 | France | Jan. 2, 1930 |